Jan. 1, 1963   G. REICH   3,071,704
GAUGE
Filed May 19, 1961

INVENTOR
Günter Reich
BY George H Spencer
ATTORNEY

United States Patent Office 3,071,704
Patented Jan. 1, 1963

3,071,704
GAUGE
Günter Reich, Koln-Zollstock, Germany, assignor to E. Leybold's Nachfolger, Koln-Bayental, Germany
Filed May 19, 1961, Ser. No. 111,304
Claims priority, application Germany June 3, 1960
9 Claims. (Cl. 313—7)

The present invention relates to ionization gauges, which are instruments for measuring very high vacuum by ionizing a gas and measuring the ion current.

Heretofore, ionization gauges known as Bayard-Alpert manometers have been used for measuring the very low pressures prevailing in the ultra-high vacuum range. These manometers differ from other prior-art ionization gauges in that the ion collector is a very thin wire or filament, which is necessary because the ion collector, when struck by X-rays, will photo-emit electrons, this photo-emission simulating an ion current. In order to keep this effect as small as possible, the ion collector has to be shielded throughout its length between the point where it passes into the vacuum envelope and the grid. In practice, a glass tube is used for this purpose.

It has been found that in ionization gauges of the above type, the pressure indication can, under certain circumstances, vary very suddenly. This has been attributed to charging and/or changes in the charge on the glass envelope.

It is, therefore, an object of the present invention to overcome the above disadvantage, and with this object in view, an ion gauge according to the present invention does not incorporate a shielding tube made of glass, as has heretofore been customary and considered most obvious. The reason for this is that further research has shown that the above-mentioned unwanted effect of obtaining sudden variations in the reading is due primarily to changes in the charge on the glass shielding tube which has heretofore been used. Thus, an ion gauge according to the instant invention uses a shielding tube which is at least partly of metallic conductive material at ground potential, i.e., a metallic tube or a glass tube provided with a metallic coating. Consequently, the charge on the shielding tube can no longer change and the above-mentioned sudden variations in the pressure reading can no longer occur.

Additional objects and advantages of the present invention will become apparent upon consideration of the following description when taken in conjunction with the accompanying drawings in which.

Figure 1:
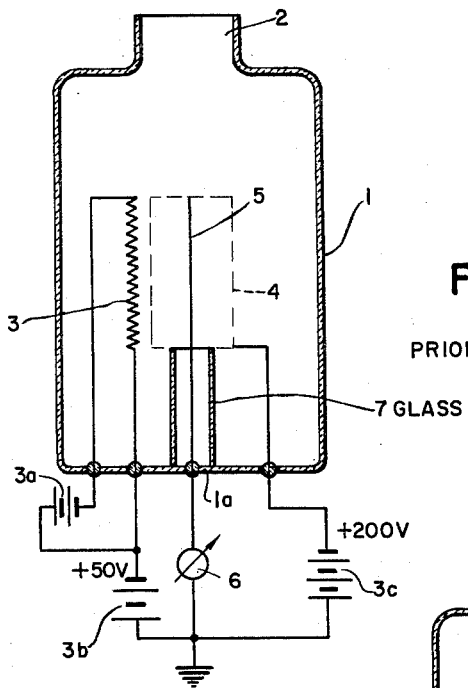
FIGURE 1 is a sectional view of a Bayard-Alpert type ionization gauge according to the prior art.

Referring now to the drawing, FIGURE 1 shows a prior art Bayard-Alpert type ionization gauge which comprises a glass envelope 1 having a neck portion 2 in communication with the chamber (not shown) wherein the pressure is to be measured. The electrons necessary for ionizing the gas are produced by means of a cathode 3 connected across a voltage source 3a. Also arranged within the envelope 1 is a tubular or cage-like electron collector or grid 4 and an ion collector constituted by a filament 5 whose upper end is surrounded by the grid 4. The ion current is measured by a measuring instrument 6 one terminal of which is connected to the filament 5, the other terminal of the instrument 6 being grounded. Also shown are a suitable voltage source 3b connected between the cathode 3 and ground, and a further voltage source 3c connected between the grid 4 and ground. Finally, FIGURE 1 shows the conventional shielding tube 7 which is made of glass and surrounds the filament 5. As is clearly shown in the drawing, the tube 7 extends between the wall portion 1a of the envelope 1 through which the filament 5 projects, and the grid 4 which itself is spaced from this wall portion 1a.

Figure 2:
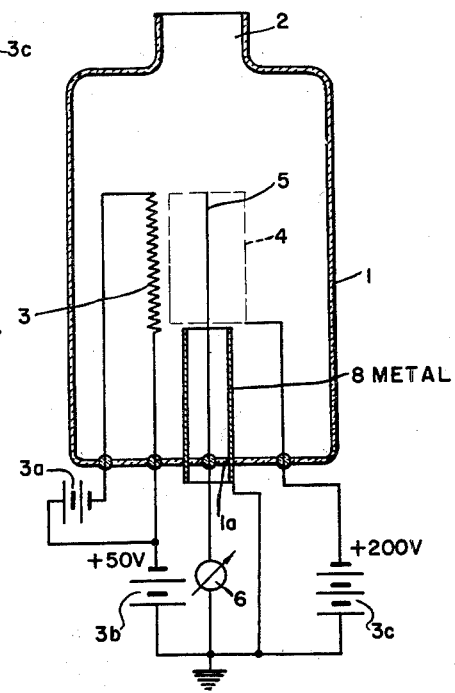
FIGURE 2 is a sectional view of one embodiment of an ionization gauge according to the present invention.

The ion gauge according to the present invention, shown in FIGURE 2, differs from the above-described ion gauge solely in that the glass tube 7 is replaced by a metal tube 8, which is grounded. The tube can either be fused into the glass envelope 1 such that it projects exteriorly thereof, or be otherwise mounted within the envelope in any suitable manner.

Figure 3:
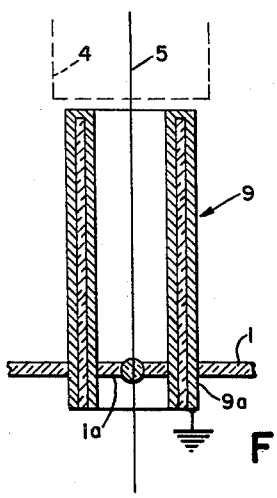
FIGURE 3 is a fragmentary sectional view of a modified embodiment of an ionization gauge according to the present invention.

FIGURE 3 shows a modified embodiment of the present invention wherein the shielding tube 9 is made of glass but is provided with a metal coating 9a, the same being grounded.

It will be understood that the above description of the present invention is susceptible to various modifications, changes, and adaptations, and the same are intended to be comprehended within the meaning and range of equivalents of the appended claims.

What is claimed is:

1. In a Bayard-Alpert type ionization gauge having a glass envelope containing an ion collector, a grid, and a shielding tube which surrounds the ion collector and extends between the point where the ion collector passes through the envelope and the grid, the improvement that said shielding tube is at least partly of metallic conductive material, passes through said glass envelope, and is joined thereto.

2. In a Bayard-Alpert type ionization gauge, the combination which comprises: a glass envelope; an ion collector passing through a wall portion of said envelope and extending into the interior of said envelope; a grid arranged within said envelope, said grid being spaced from said wall portion and encompassing a portion of said filament; and a shielding tube extending from said wall portion to said grid and surrounding said filament, said tube being made at least in part of metallic conductive material.

3. The combination defined in claim 2 wherein said shielding tube is made entirely of metal.

4. The combination defined in claim 3 wherein said shielding tube is grounded.

5. The combination defined in claim 2 wherein said tube is made of glass and said part of metallic conductive material is constituted by a metallic conductive coating.

6. The combination defined in claim 5 wherein said coating is grounded.

7. The combination defined in claim 2 wherein said shielding tube is mounted within said envelope.

8. The combination defined in claim 2 wherein said shielding tube projects through said envelope.

9. The combination defined in claim 2 wherein said shielding tube is fused to said envelope.

References Cited in the file of this patent
UNITED STATES PATENTS
2,836,790    Hickam et al. _____ May 27, 1958